United States Patent
Dou et al.

(10) Patent No.: US 10,263,698 B2
(45) Date of Patent: Apr. 16, 2019

(54) MONITORING APPARATUS FOR OPTICAL SIGNAL TO NOISE RATIO, SIGNAL TRANSMISSION APPARATUS AND RECEIVER

(71) Applicant: FUJITSU LIMITED, Kawasaki (JP)

(72) Inventors: Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 37 days.

(21) Appl. No.: 15/291,216

(22) Filed: Oct. 12, 2016

(65) Prior Publication Data
US 2017/0104529 A1    Apr. 13, 2017

(30) Foreign Application Priority Data
Oct. 12, 2015   (CN) .......................... 2015 1 0659086

(51) Int. Cl.
*H04J 14/08*    (2006.01)
*H04L 5/00*    (2006.01)
(Continued)

(52) U.S. Cl.
CPC ... *H04B 10/07953* (2013.01); *H04B 10/0775* (2013.01); *H04B 10/07951* (2013.01);
(Continued)

(58) Field of Classification Search
CPC ........ H04B 10/08; H04B 10/06; H04B 10/66; H04B 10/07951; H04B 10/07953; H04B 10/541; H04B 10/564; H04B 10/0775; H04B 2210/075; H04B 10/04; H04B 10/077; H04B 10/079; H04B 10/516;
(Continued)

(56) References Cited

U.S. PATENT DOCUMENTS 6,396,051 B1 * 5/2002 Li ...................... G02B 6/29322
                                                  250/227.18
7,116,454 B2 * 10/2006 Elbers .............. H04B 10/07953
                                                     398/25
(Continued)

FOREIGN PATENT DOCUMENTS

CN    101312364 A    11/2008
CN    104904141 A    9/2015

OTHER PUBLICATIONS

Chinese Office Action dated Jul. 19, 2018 in corresponding Chinese Patent Application No. 201510659086.5 (3 pages) (5 pages English Translation).

(Continued)

*Primary Examiner* — Kenneth N Vanderpuye
*Assistant Examiner* — Abbas H Alagheband
(74) *Attorney, Agent, or Firm* — Staas & Halsey LLP (57) ABSTRACT

Embodiments of the present disclosure provide a monitoring apparatus for an optical signal to noise ratio, a signal transmission apparatus and a receiver. White noise power of received signals is calculated according to noise power and power of pilot signals of the received signals in different polarization states, and influence of a nonlinear noise is excluded, thereby accurately estimating an optical signal to noise ratio, for example, with a calculation process being simple and an application range being relatively wide.

5 Claims, 7 Drawing Sheets

(51) Int. Cl.
  *H04B 10/54* (2013.01)
  *H04J 14/06* (2006.01)
  *H04B 10/077* (2013.01)
  *H04B 10/079* (2013.01)
  *H04B 10/516* (2013.01)
  *H04B 10/564* (2013.01)

(52) U.S. Cl.
  CPC ......... *H04B 10/541* (2013.01); *H04B 10/564* (2013.01); *H04J 14/06* (2013.01); *H04B 10/516* (2013.01); *H04B 2210/075* (2013.01); *H04J 14/08* (2013.01); *H04L 5/0048* (2013.01)

(58) Field of Classification Search
  CPC ......... H04B 10/61; H04B 17/00; H04J 14/06; H04J 14/08; H04J 14/16; H04L 5/0048; H04L 12/26; G02B 5/13; H01S 3/00
  USPC ..... 398/26, 208, 65; 370/241; 375/222, 320, 375/229
  See application file for complete search history.

(56) References Cited

U.S. PATENT DOCUMENTS

| | | | | | |
|---|---|---|---|---|---|
| 7,421,015 | B2* | 9/2008 | Sedarat | ............... | H04L 27/2608 375/222 |
| 7,440,170 | B2* | 10/2008 | Kao | ................. | H04B 10/07953 359/337.2 |
| 8,285,148 | B2* | 10/2012 | Haunstein | ............... | H04B 10/60 398/158 |
| 8,588,624 | B2* | 11/2013 | Zhang | ................ | H04B 10/0779 398/208 |
| 8,611,741 | B2* | 12/2013 | Feuer | ............... | H04B 10/07953 398/26 |
| 8,699,880 | B2* | 4/2014 | Grigoryan | ............ | H04B 10/548 398/152 |
| 8,867,368 | B2* | 10/2014 | Pelekhaty | .......... | H04B 10/6162 370/208 |
| 9,007,921 | B2* | 4/2015 | Pelekhaty | .......... | H04B 10/6162 370/208 |
| 9,008,512 | B2* | 4/2015 | Nazarathy | ............ | H04B 10/272 398/65 |
| 9,479,260 | B2* | 10/2016 | Zhang | ................ | H04B 10/5161 |
| 9,621,299 | B2* | 4/2017 | Ishihara | ........... | H04B 10/25133 |
| 9,722,698 | B2* | 8/2017 | Dahan | ................ | H04B 10/0793 |
| 9,838,115 | B2* | 12/2017 | Pincennin | .......... | H04B 10/0775 |
| 2002/0126748 | A1* | 9/2002 | Rafie | ................... | H04L 27/0014 375/229 |
| 2003/0011835 | A1* | 1/2003 | Elbers | .............. | H04B 10/07953 398/5 |
| 2004/0156632 | A1* | 8/2004 | Lee | .................... | H04B 10/0775 398/26 |
| 2005/0190825 | A1* | 9/2005 | Sedarat | ............... | H04L 27/2608 375/222 |
| 2007/0297043 | A1* | 12/2007 | Kao | ................. | H04B 10/07953 359/337 |
| 2009/0060494 | A1* | 3/2009 | Renner | ............. | H04B 10/0799 398/9 |
| 2009/0196603 | A1* | 8/2009 | Zhou | ................ | H04B 10/0773 398/32 |
| 2009/0201980 | A1* | 8/2009 | Wu | ...................... | H04B 17/345 375/227 |
| 2009/0310715 | A1* | 12/2009 | Cairns | .................. | H04L 1/0041 375/320 |
| 2011/0110657 | A1* | 5/2011 | Feuer | ............... | H04B 10/07953 398/26 |
| 2011/0255870 | A1* | 10/2011 | Grigoryan | ............ | H04B 10/548 398/65 |
| 2011/0274442 | A1* | 11/2011 | Zhang | ................ | H04B 10/0779 398/208 |
| 2012/0155574 | A1* | 6/2012 | Cairns | .................. | H04L 1/0041 375/320 |
| 2013/0216228 | A1* | 8/2013 | Nazarathy | ............ | H04B 10/272 398/65 |
| 2014/0050476 | A1* | 2/2014 | Grigoryan | .......... | H04B 10/2572 398/65 |
| 2014/0064102 | A1* | 3/2014 | Pelekhaty | .......... | H04B 10/6162 370/241 |
| 2014/0369686 | A1* | 12/2014 | Pelekhaty | .......... | H04B 10/6162 398/65 |
| 2015/0341138 | A1* | 11/2015 | Ishihara | ........... | H04B 10/25133 398/35 |
| 2015/0372762 | A1* | 12/2015 | Zhang | ................ | H04B 10/5161 398/26 |
| 2016/0142134 | A1* | 5/2016 | Pincemin | ........... | H04B 10/0775 398/26 |
| 2016/0204871 | A1* | 7/2016 | Li | ....................... | H04L 27/2601 398/183 |
| 2017/0180055 | A1* | 6/2017 | Yu | ....................... | H04B 10/612 |

OTHER PUBLICATIONS

Chinese Search Report dated Jul. 19, 2018 in corresponding Chinese Patent Application No. 201510659086.5 (2 pages) (2 pages English Translation).

* cited by examiner

FIG. 1

H polarization state    V polarization state

Signals containing pilot signals are transmitted respectively in a first polarization state and a second polarization state, power of the pilot signals of the signals transmitted in the first polarization state and the second polarization state is different

FIG. 13

MONITORING APPARATUS FOR OPTICAL SIGNAL TO NOISE RATIO, SIGNAL TRANSMISSION APPARATUS AND RECEIVER

CROSS-REFERENCE TO RELATED APPLICATIONS

This application claims the priority benefit of Chinese Patent Application No. 201510659086.3 filed on Oct. 12, 2015 in the Chinese State Intellectual Property Office, the disclosure of which is incorporated herein in its entirety by reference.

BACKGROUND

1. Field

The present disclosure relates to the field of communications, and in particular to a monitoring apparatus for an optical signal to noise ratio, a signal transmission apparatus and a receiver.

2. Description of the Related Art

No matter in a conventional direct detection optical communication system or in a coherent optical communication system, an optical signal to noise ratio (OSNR) is a quantity that may be directly associated with the system performance. Hence, attention has been paid to the study of the monitoring technology of the OSNR.

A conventional measurement method based on the definition of OSNR relies on such conditions as that a noise power spectrum is flat and a band containing a noise but containing no signal exists in the spectrum. As increase of an optical communication capacity, a transmission length and a transmission rate of the coherent optical communication system are largely improved. More optical nodes will result in larger fluctuation of a spectral shape of the noise, and an assumption of noises being evenly distributed on the spectrum will face larger challenges. And in the same time, as channel intervals are largely reduced, finding a band where signals may be neglected to measure noise power becomes an impractical subject. Hence, measurement of OSNR in a coherent optical communication system becomes a new hot spot of studies.

In a practical communication system, besides noises of a transmission link itself, noises introduced by a nonlinear effect are further included. Wherein, the noises include noises introduced by an intra-channel nonlinear effect and noises introduced by an inter-channel nonlinear effect. In practical OSNR monitoring, when the noises introduced by the nonlinear effect cannot be excluded, an estimated value of the OSNR will be relatively low. In order to alleviate interference of the nonlinear noises on the estimated value of the OSNR, an existing method is to nonlinearly compensate for received signals in a receiving end.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

According to an embodiment of the present disclosure, there is provided a monitoring apparatus for an optical signal to noise ratio. The monitoring apparatus according to an embodiment includes, a selecting unit configured to, based on positions of pilot signals in received signals in a first polarization state and a second polarization state, select a phase noise area and/or a polarization crosstalk area used for calculating noise power in the received signals, and a first calculating unit configured to calculate the noise power of the received signals in the first polarization state and the second polarization state in a selected phase noise area and/or polarization crosstalk area.

The monitoring apparatus according to an embodiment includes, a second calculating unit configured to calculate white noise power of the received signals according to the noise power of the received signals in the first polarization state and the second polarization state and power of the pilot signals in the received signals in the first polarization state and the second polarization state, where power of the pilot signals in the received signals in the first polarization state and the second polarization state is different, and a third calculating unit configured to calculate an optical signal to noise ratio of the received signals according to the white noise power of the received signals.

According to an embodiment of the present disclosure, there is provided a signal transmission apparatus, including: a transmitting unit configured to transmit signals containing pilot signals respectively in a first polarization state and a second polarization state; wherein power of the pilot signals of the signals transmitted in the first polarization state and the second polarization state are different.

According to an embodiment of the present disclosure, there is provided a receiver, including the monitoring apparatus for an optical signal to noise ratio as described herein.

An advantage of embodiments of the present disclosure exists in that white noise power of received signals is calculated according to noise power and power of pilot signals of the received signals in different polarization states, and influence of a nonlinear noise is excluded, thereby accurately estimating an optical signal to noise ratio, with a calculation process being simple and an application range being relatively wide, for example.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

With reference to the following description and drawings, the particular embodiments of the present disclosure are disclosed in detail, and the principles of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

Reference to a "unit" may denote hardware, processor, or components of computing hardware, etc. and/or software executed by the computing hardware, that perform a function.

When the above existing method is used to nonlinearly compensate for the received signals in the receiving end, a nonlinear compensation algorithm needs to be based on a link reversal method to solve a nonlinear Schrodinger equation, which is complex in operation and relatively narrow in application range.

Embodiments of the present disclosure provide a monitoring apparatus for an optical signal to noise ratio, a signal transmission apparatus and a receiver, in which white noise power of received signals is calculated according to noise power and power of pilot signals of the received signals in different polarization states, and influence of a nonlinear noise is excluded, thereby accurately estimating an optical signal to noise ratio, with a calculation process being simple and an application range being relatively wide.

Embodiment 1

Figure 1:
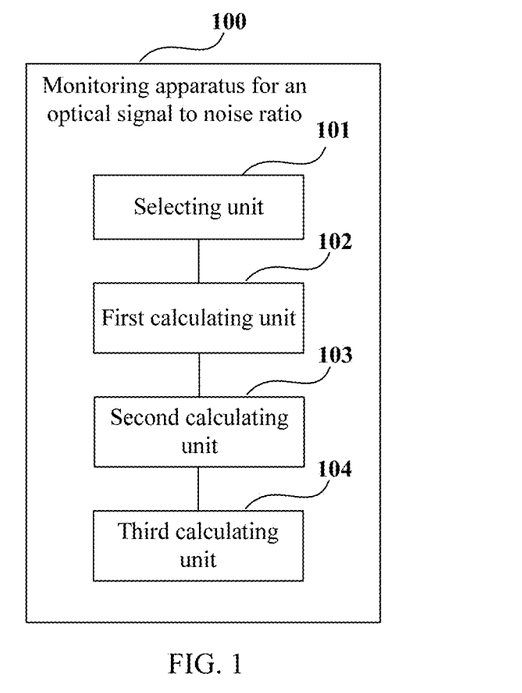
FIG. 1 is a schematic diagram of a structure of the monitoring apparatus for an optical signal to noise ratio according to an embodiment of the present disclosure.

An embodiment of the present disclosure provides a monitoring apparatus for an optical signal to noise ratio, which is applicable to a receiving end of a communications system. FIG. 1 is a schematic diagram of a structure of the monitoring apparatus for an optical signal to noise ratio of Embodiment 1 of the present disclosure.

As shown in FIG. 1, the apparatus 100 (monitoring apparatus for an optical signal to noise ratio) includes a selecting unit 101 configured to, based on positions of pilot signals in received signals in a first polarization state and a second polarization state, select a phase noise area and/or a polarization crosstalk area used for calculating noise power in the received signals. The apparatus 100 in FIG. 1 includes a first calculating unit 102 configured to calculate the noise power of the received signals in the first polarization state and the second polarization state in a selected phase noise area and/or polarization crosstalk area, a second calculating unit 103 configured to calculate white noise power of the received signals according to the noise power of the received signals in the first polarization state and the second polarization state and power of the pilot signals in the received signals in the first polarization state and the second polarization state, where the power of the pilot signals in the received signals in the first polarization state and the second polarization state is different.

As shown in FIG. 1, the apparatus 100 includes a third calculating unit 104 configured to calculate an optical signal to noise ratio of the received signals according to the white noise power of the received signals.

It can be seen from the above embodiment that the white noise power of the received signals is calculated according to the noise power and the power of pilot signals of the received signals in different polarization states, and influence of the nonlinear noise is excluded, thereby accurately estimating the optical signal to noise ratio, with a calculation process being simple and an application range being relatively wide.

In this embodiment, the received signals refer to signals in an optical communications system transmitted from a transmitting end and received in a receiving end after passing a transmission link. In this embodiment, as the pilot signals are interpolated into the transmission signals, the received signals also contain the pilot signals.

In this embodiment, pilot signals of different frequencies may be respectively transmitted in the two polarization states. For example, signals containing pilot signals are respectively transmitted in the first polarization state and the second polarization state. For example, power of the pilot signals of the signals transmitted in the first polarization state and the second polarization state are different. Hence, as the power of the pilot signals in the first polarization state and the second polarization state is different, the white noise power may be calculated in the receiving end by using a ratio of the power of the pilot signals in the first polarization state and the second polarization state.

In this embodiment, the power of the pilot signals in the signals transmitted in the first polarization state and the second polarization state may be determined according to constellation points having different modulus values in a constellation map of quadrature amplitude modulation (QAM). In this way, by determining the power of the pilot signals in the two polarization states according to the constellation points having different modulus values in the constellation map, the power of the pilot signals in the two polarization states is made different, thereby avoiding fluctuation of the transmission power and over-high complexity of implementation.

In this embodiment, the first polarization state is, for example, the H polarization state, and the second polarization state is, for example, the V polarization state.

A method for transmitting pilot signals of this embodiment shall be illustrated below taking a 16QAM constellation map as an example.

Figure 2:
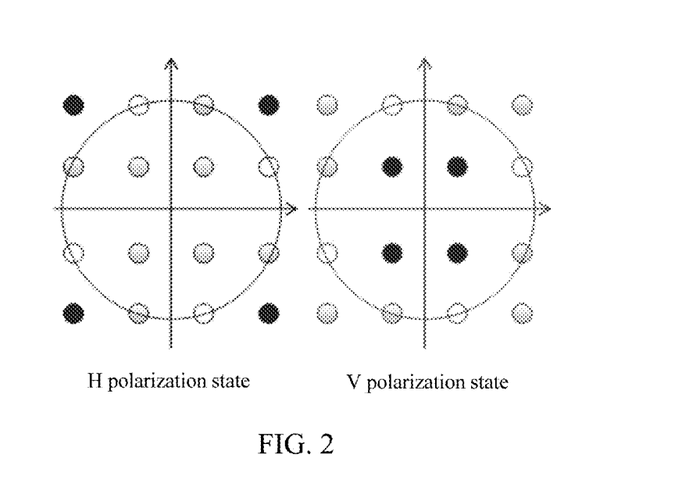
FIG. 2 is a 16QAM constellation map for determining power of pilot signals in transmission signals according to an embodiment of the present disclosure.

FIG. 2 is a 16QAM constellation map for determining power of pilot signals in transmission signals of Embodiment 1 of the present disclosure. As shown in FIG. 2, for the H polarization state, constellation points in the outermost turn may be selected clockwise, and power of the pilot signals transmitted in the H polarization state may be determined according to selected constellation points; and for the V polarization state, constellation points in the innermost turn may be selected counterclockwise, and power of the pilot signals transmitted in the V polarization state may be determined according to selected constellation points. In this embodiment, starting points of the constellation points in the outermost turn selected clockwise and the constellation points in the innermost turn selected counterclockwise are not limited, only when modulo values of the selected two constellation points are different.

In this embodiment, description is given taking 16QAM as an example. Furthermore, for other QAM modulation formats, power of pilot signals transmitted in the H polarization state and the V polarization state may be determined in a similar manner.

Figure 3:
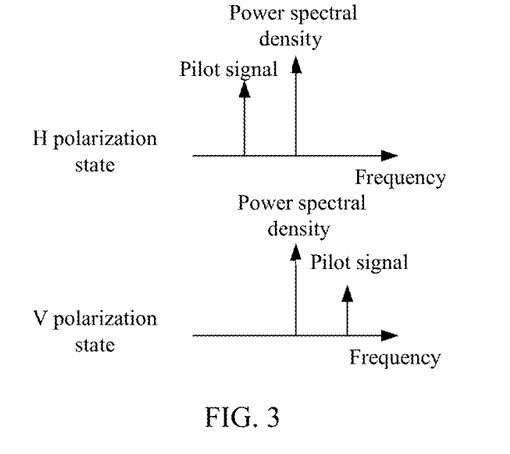
FIG. 3 is a schematic diagram of pilot signals transmitted in two polarization states according to an embodiment of the present disclosure.

FIG. 3 is a schematic diagram of pilot signals transmitted in the two polarization states of Embodiment 1 of the present disclosure. As shown in FIG. 3, both frequencies and power of the pilot signals transmitted in the H polarization state and the V polarization state are different.

In this embodiment, the selecting unit 101 is configured to, based on the positions of the pilot signals in the received signals in the first polarization state and the second polarization state, select the phase noise area and/or the polarization crosstalk area used for calculating the noise power in the received signals.

In a communications system, an inter-channel nonlinear effect is also referred to as a cross-phase modulation (XPM), and nonlinear noises produced by the XPM may further be divided into two types, a phase noise and polarization crosstalk. For the pilot signal in the H polarization state, spectrum of the phase noise are concentrated near a frequency of the pilot signal, and due to a low-pass filtering effect of the XPM, a range of the spectrum of the phase noise is relatively concentrated within several GHzs. Different from the intra-channel nonlinear noises and the inter-channel phase noise, the polarization crosstalk appears near frequency to which a pilot signal in an orthogonal polarization state correspond, that is, near the frequency of the pilot signal in the V polarization state.

In this embodiment, the polarization crosstalk is an additive noise, which may be denoted by Formula (1) below:

$$C = u_{1V} \times u_{2H} \times \mathrm{conj}(u_{2V}) \qquad (1);$$

where, subscript 1 denotes a current channel, subscript 2 denotes a neighboring channel, $u_{1V}$ denotes a time domain waveform of the current channel in the V polarization state, $u_{2H}$ denotes a time domain waveform of the neighboring channel in the H polarization state, $u_{2V}$ denotes a time domain waveform of the neighboring channel in the V polarization state, and conj denotes a conjugate operation.

Figure 4:
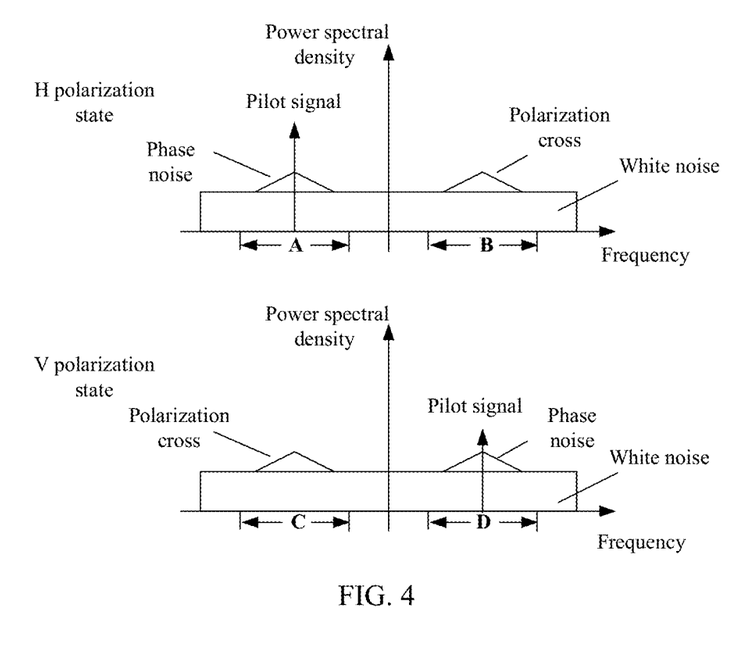
FIG. 4 is a frequency spectrogram of the received signals in the two polarization states according to an embodiment of the present disclosure.

FIG. 4 is a frequency spectrogram of the received signals in the two polarization states of Embodiment 1 of the present disclosure. As shown in FIG. 4, for the H polarization state, the phase noise is near the frequency of the pilot signal in the H polarization state, and the polarization cross is near the frequency of the pilot signal in the V polarization state; and for the V polarization state, the phase noise is near the frequency of the pilot signal in the V polarization state, and the polarization cross is near the frequency of the pilot signal in the H polarization state.

In this embodiment, for the H polarization state, the phase noise area selected by the selecting unit 101 is near the frequency of the pilot signal, such as area A shown in FIG. 4, and the selected polarization crosstalk area is near the frequency of the pilot signal in the V polarization state, such as area B shown in FIG. 4; and for the V polarization state, the phase noise area selected by the selecting unit 101 is near the frequency of the pilot signal, such as area D shown in FIG. 4, and the selected polarization crosstalk area is near the frequency of the pilot signal in the H polarization state, such as area C shown in FIG. 4.

In this embodiment, a size(s) of the selected phase noise area and/or the polarization crosstalk area may be set according to an actual situation, which is (are) not limited in this embodiment.

In this embodiment, the selecting unit 101 may select both areas A and B, or both areas C and D, and may also select one of areas A and B. for example, when phase noise area A is selected for the H polarization state, phase noise area D is correspondingly selected for the V polarization state, and when phase noise area B is selected for the H polarization state, phase noise area C is correspondingly selected for the V polarization state.

In this embodiment, the selecting unit 101 may select the phase noise area and/or the polarization crosstalk area used for calculating the noise power based on the positions of the pilot signals in the received signals and according to dispersion generated in the transmission link.

Hence, by selecting the phase noise area or the polarization crosstalk area used for calculating the noise power according to dispersion generated in the transmission link, or taking both the phase noise area and the polarization crosstalk area as areas used for calculating the noise power, accuracy of estimation of the OSNR may further be improved.

Figure 5:
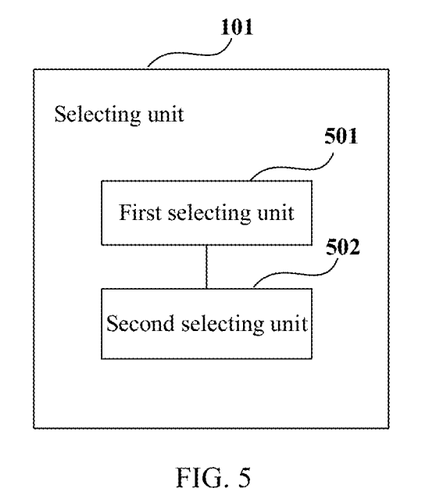
FIG. 5 is a schematic diagram of a structure of the selecting unit 101 according to an embodiment of the present disclosure.

FIG. 5 is a schematic diagram of a structure of the selecting unit 101 of Embodiment 1 of the present disclosure. As shown in FIG. 5, the selecting unit 101 includes a first selecting unit 501 configured to select the phase noise area based on the positions of the pilot signals in the received signals when the dispersion generated in the transmission link is greater than a predetermined threshold value. The selecting unit 101 includes a second selecting unit 502 configured to select the phase noise area and/or the polarization crosstalk area based on the positions of the pilot signals in the received signals when the dispersion generated in the transmission link is less than or equal to the predetermined threshold value.

In this embodiment, the predetermined threshold value may be set according to an actual situation, which is not limited in this embodiment.

In this embodiment, the first calculating unit 102 is configured to calculate the noise power of the received signals in the first polarization state and the second polarization state in the selected phase noise area and/or polarization crosstalk area. In this embodiment, the noise power of the received signals may be calculated by using an existing method. For example, a noise power spectral density of the received signals within the above selected range of frequencies may be multiplied by a spectral width to obtain the noise power.

In this embodiment, the second calculating unit 103 is configured to calculate the white noise power of the received signals according to the noise power of the received signals in the first polarization state and the second polarization state and the power of the pilot signals in the received signals in the first polarization state and the second polarization state. In this embodiment, the power of the pilot signals in the received signals in the first polarization state and the second polarization state is different. For example, the second calculating unit 103 calculates the white noise power of the received signals according to a relationship between a ratio of the noise power of the received signals in the first polarization state and the second polarization state and a ratio of the power of the pilot signals in the received signals in the first polarization state and the second polarization state.

Methods for calculating the white noise power of the received signals shall be illustrated below respectively taking that the selected area is the phase noise area and the selected area is the polarization crosstalk area as examples.

In this embodiment, the noise power of the received signals in the H polarization state and the V polarization state calculated by the first calculating unit 102 may be expressed respectively by formulae (2) and (3) below:

$$N_H = N_{ASE} + N_{NL\_H} \quad (2),$$

$$N_V = N_{ASE} + N_{NL\_V} \quad (3);$$

where, $N_H$ and $N_V$ respectively denote the noise power of the received signals in the H polarization state and the V polarization state, $N_{ASE}$ denotes the white noise power of the received signals, and NL_H and NL_V respectively denote the inter-channel nonlinear noise power of the received signals in the H polarization state and the V polarization state.

It is assumed that the area selected by the selecting unit 101 is the phase noise area, such as areas A and D shown in FIG. 4. As the phase noise power is proportional to the signal power of the current channel in the current polarization state, the relationship between the ratio of the noise power of the received signals in the H polarization state and the V polarization state and the ratio of the power of the pilot signals in the received signals in the H polarization state and the V polarization state may be expressed by Formula (4) below:

$$N_{NL\_H}/N_{NL\_V} = P_H/P_V \quad (4);$$

where, $N_{NL\_H}$ and $N_{NL\_V}$ respectively denote the inter-channel nonlinear noise power of the received signals in the H polarization state and the V polarization state, $P_H$ and $P_V$ respectively denote the power of the pilot signals in the received signals in the H polarization state and the V polarization state.

Hence, following Formula (5) may be obtained according to above formulae (2)-(4):

$$(N_H - N_{ASE})/(N_V - N_{ASE}) = P_H/P_V \quad (5).$$

In this embodiment, as $P_H$ and $P_V$ are different, $N_{ASE}$, i.e. the white noise power of the received signals, may be calculated according to Formula (5).

It is assumed that the area selected by the selecting unit 101 is the polarization crosstalk area, such as areas B and C shown in FIG. 4. As the phase noise power is proportional to the signal power of the current channel in the orthogonal polarization state, the relationship between the ratio of the noise power of the received signals in the H polarization state and the V polarization state and the ratio of the power of the pilot signals in the received signals in the H polarization state and the V polarization state may be expressed by Formula (6) below:

$$N_{NL\_H}/N_{NL\_V} = P_V/P_H \quad (6);$$

where, $N_{NL\_H}$ and $N_{NL\_V}$ respectively denote the inter-channel nonlinear noise power of the received signals in the H polarization state and the V polarization state, $P_H$ and $P_V$ respectively denote the power of the pilot signals in the received signals in the H polarization state and the V polarization state.

Hence, following Formula (7) may be obtained according to above formulae (2), (3) and (6):

$$(N_H - N_{ASE})/(N_V - N_{ASE}) = P_V/P_H \quad (7).$$

In this embodiment, as $P_H$ and $P_V$ are different, $N_{ASE}$, i.e. the white noise power of the received signals, may be calculated according to Formula (7).

In this embodiment, the areas selected by the selecting unit 101 are the phase noise area and the polarization crosstalk area, two pieces of white noise power may be calculated according to formulae (5) and (7) respectively, and an average value of the two pieces of white noise power may be taken as the white noise power for calculating the OSNR.

In this embodiment, after the white noise power of the received signals is calculated, the third calculating unit 104 calculates the OSNR of the received signals according to the white noise power of the received signals. In this embodiment, the OSNR may be calculated by using an existing method.

For example, the OSNR of the received signals may calculated by using Formula (8) below:

$$\text{OSNR} = 10*\log 10(S/n) - 10*\log 10(12.5e9/\text{Bandwidth}) \quad (8);$$

where, OSNR denotes the OSNR of the received signals, S denotes the signal power, n denotes the white noise power, Bandwidth denotes a signal bandwidth, and 12.5e9 denotes a numeral value adopted in taking noise power in a 12.5 GHz bandwidth into account; however, the numeral value 12.5e9 may be adjusted according to a particular bandwidth.

It can be seen from the above embodiment that the white noise power of received signals is calculated according to the noise power and power of pilot signals of the received signals in different polarization states, and influence of a nonlinear noise is excluded, thereby accurately estimating the optical signal to noise ratio, with the calculation process being simple and the application range being relatively wide.

Embodiment 2

Figure 6:
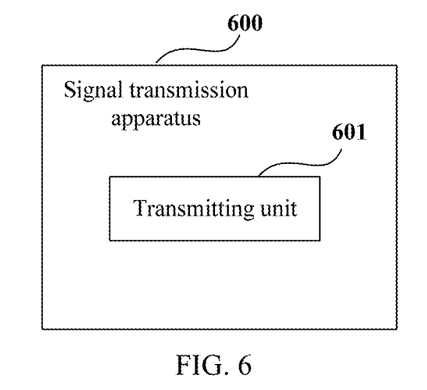
FIG. 6 is a schematic diagram of a structure of the signal transmission apparatus according to an embodiment of the present disclosure.

An embodiment of the present disclosure further provides a signal transmission apparatus, applicable to a transmitting end of a communications system. FIG. 6 is a schematic diagram of a structure of the signal transmission apparatus of Embodiment 2 of the present disclosure. As shown in FIG. 6, the apparatus 600 includes a transmitting unit (transmitter, for example) 601.

In this embodiment, the transmitting unit 601 is configured to transmit signals containing pilot signals respectively in a first polarization state and a second polarization state, power of the pilot signals of the signals transmitted in the first polarization state and the second polarization state is different.

In this embodiment, a method for transmitting signals by the transmitting unit 601 is identical to that described in Embodiment 1. For example, the transmitting unit 601 may determine the power of pilot signals of the signals transmitted in the first polarization state and the second polarization state according to constellation points having different modulo values in a constellation map of quadrature amplitude modulation. For example, the power of pilot signals may be determined according to the constellation map shown in FIG. 2.

It can be seen from the above embodiment that as the power of the pilot signals of the signals transmitted in the first polarization state and the second polarization state are different, the white noise power of received signals is calculated according to the noise power and power of pilot signals of the received signals in different polarization states, and influence of a nonlinear noise is excluded, thereby accurately estimating the optical signal to noise ratio, with the calculation process being simple and the application range being relatively wide.

Embodiment 3

Figure 7:
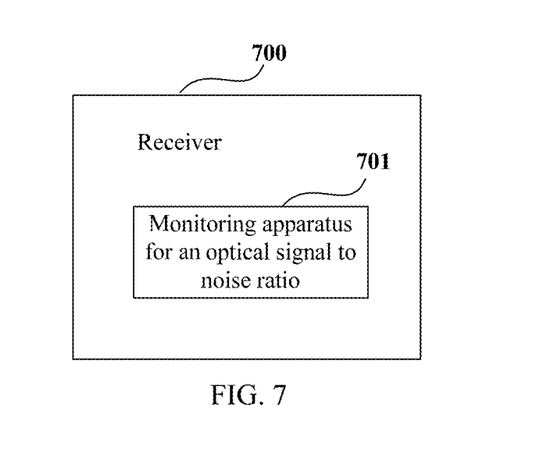
FIG. 7 is a schematic diagram of a structure of the receiver according to an embodiment of the present disclosure.

An embodiment of the present disclosure further provides a receiver. FIG. 7 is a schematic diagram of a structure of the receiver of Embodiment 3 of the present disclosure. As shown in FIG. 7, the receiver 700 includes a monitoring apparatus 701 for an optical signal to noise ratio, a structure and functions of the monitoring apparatus 701 for an optical signal to noise ratio being identical to those described in Embodiment 1, and being not going to be described herein any further.

Figure 8:
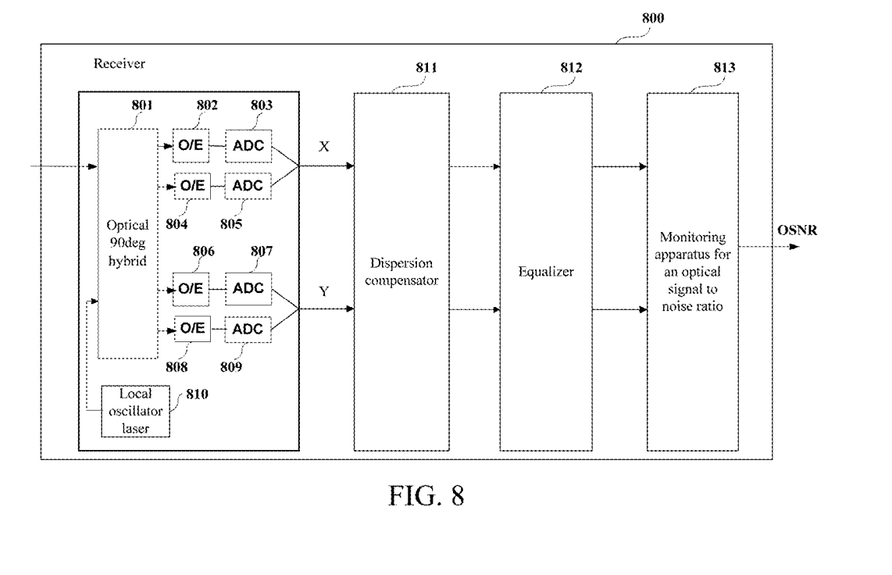
FIG. 8 is a block diagram of a systematic structure of the receiver according to an embodiment of the present disclosure.

FIG. 8 is a block diagram of a systematic structure of the receiver of Embodiment 3 of the present disclosure. As shown in FIG. 8, the receiver 800 includes:

a front end configured to convert inputted optical signals into baseband signals in two polarization states. In this embodiment, the two polarization states may include an H polarization state and a V polarization state.

As shown in FIG. 8, the front end includes: an local oscillator laser 810, an optical 90 deg hybrid 801, optoelectronic (O/E) detectors 802, 804, 806 and 808, analog-to-digital converters (ADCs) 803, 805, 807 and 809, a dispersion compensator 811, an equalizer 812 and a monitoring apparatus 813 for an optical signal to noise ratio. In this embodiment, a structure and functions of the monitoring apparatus 813 for an optical signal to noise ratio is identical to those described in Embodiment 1, and shall not be described herein any further. The local oscillator laser 810 is configured to provide a local light source, and optical signals are converted into baseband signals in one polarization state after passing through the optical 90 deg hybrid 801, the optoelectronic (O/E) detectors 802 and 804 and the analog-to-digital converters (ADCs) 803 and 805, and are converted into baseband signals in the other polarization state after passing through the optical 90 deg hybrid 801, the optoelectronic (O/E) detectors 806 and 808 and the analog-to-digital converters (ADCs) 807 and 809; and a particular process of implementation is similar to that in the related art, and shall not be described herein any further.

Furthermore, when a frequency difference and a phase noise have effect on estimation of an OSNR, the receiver 800 may further include a frequency difference compensator and a phase noise compensator (not shown in FIG. 8).

It can be seen from the above embodiment that the white noise power of received signals is calculated according to the noise power and power of pilot signals of the received signals in different polarization states, and influence of a nonlinear noise is excluded, thereby accurately estimating the optical signal to noise ratio, with the calculation process being simple and the application range being relatively wide.

Embodiment 4

Figure 9:
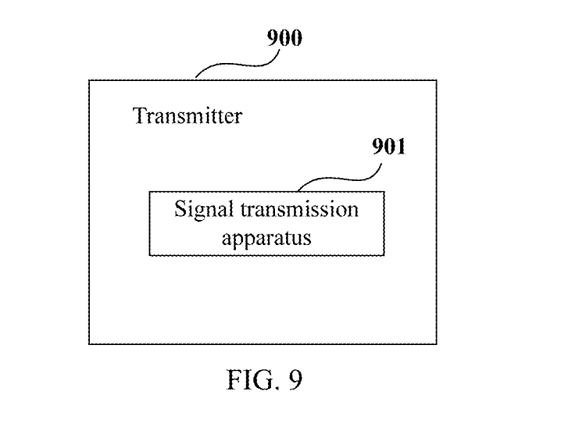
FIG. 9 is a schematic diagram of a structure of the transmitter according to an embodiment of the present disclosure.

An embodiment of the present disclosure further provides a transmitter. FIG. 9 is a schematic diagram of a structure of the transmitter of Embodiment 4 of the present disclosure. As shown in FIG. 9, the transmitter 900 includes a signal transmission apparatus 901, a structure and functions of the signal transmission apparatus 901 being identical to those described in Embodiment 2, and being not going to be described herein any further.

Figure 10:
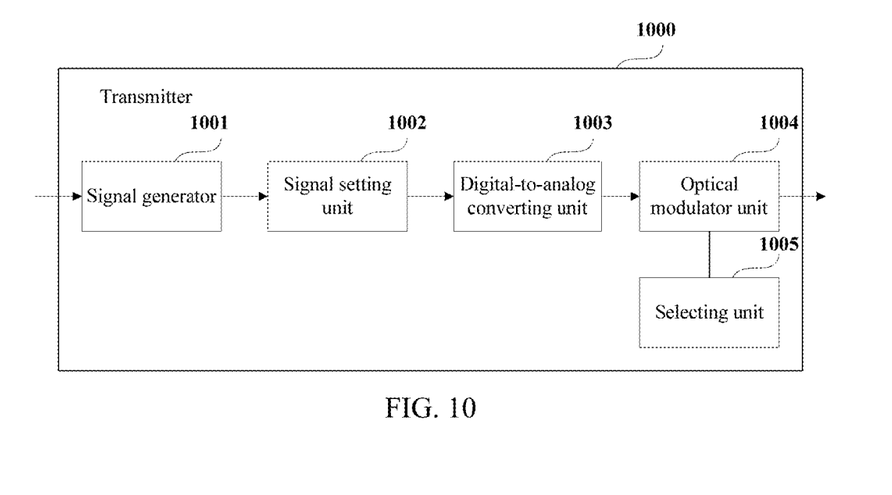
FIG. 10 is a block diagram of a systematic structure of the transmitter according to an embodiment of the present disclosure.

FIG. 10 is a block diagram of a systematic structure of the transmitter of Embodiment 4 of the present disclosure. As shown in FIG. 10, the transmitter 1000 includes a signal generator 1001, a signal setting unit 1002, a digital-to-analog converting unit 1003 and an optical modulator unit 1004.

The signal generator 1001 generates digital signals according to transmission data, the signal setting unit 1002 sets pilot signals in generated digital signals in the manner described in Embodiment 2, that is, the pilot signals transmitted in the first polarization station and the second polarization state are made to have different power; the digital-to-analog converting unit 1003 performs digital-to-analog conversion on the digital signals; and the optical modulator unit 1004 modulates light by taking the signals converted by the digital-to-analog converting unit 1003 as modulation signals; furthermore, a selecting unit 1005 may be included, and the optical modulator unit 1004 performs signal modulation according to codewords selected by the selecting unit 1005, so that frequencies of pilot signals in different polarization states are different.

It can be seen from the above embodiment that as the power of the pilot signals of the signals transmitted in the first polarization state and the second polarization state are different, the white noise power of received signals is calculated according to the noise power and power of pilot signals of the received signals in different polarization states, and influence of a nonlinear noise is excluded, thereby accurately estimating the optical signal to noise ratio, with the calculation process being simple and the application range being relatively wide.

Embodiment 5

Figure 11:
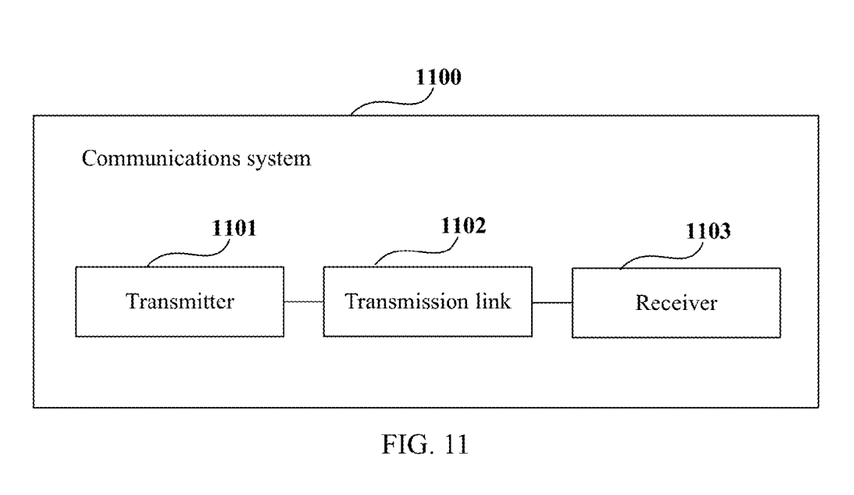
FIG. 11 is a schematic diagram of a structure of the communication system according to an embodiment of the present disclosure.

An embodiment of the present disclosure further provides a communications system. FIG. 11 is a schematic diagram of a structure of the communications system of this embodiment. As shown in FIG. 11, the communications system 1100 includes a transmitter 1101, a transmission link 1102 and a receiver 1103.

In this embodiment, a structure and functions of the transmitter 1101 is identical to those described in Embodiment 4, and a structure and functions of the receiver 1103 is identical to those described in Embodiment 3, which shall not be described herein any further. And the transmission link 1102 may have a structure and functions of an existing transmission link, and a structure and functions of the transmission link are not limited in embodiments of the present disclosure.

It can be seen from the above embodiment that as the power of the pilot signals of the signals transmitted in the first polarization state and the second polarization state are different, the white noise power of received signals is calculated according to the noise power and power of pilot signals of the received signals in different polarization states, and influence of a nonlinear noise is excluded, thereby accurately estimating the optical signal to noise ratio, with the calculation process being simple and the application range being relatively wide.

Embodiment 6

Figure 12:
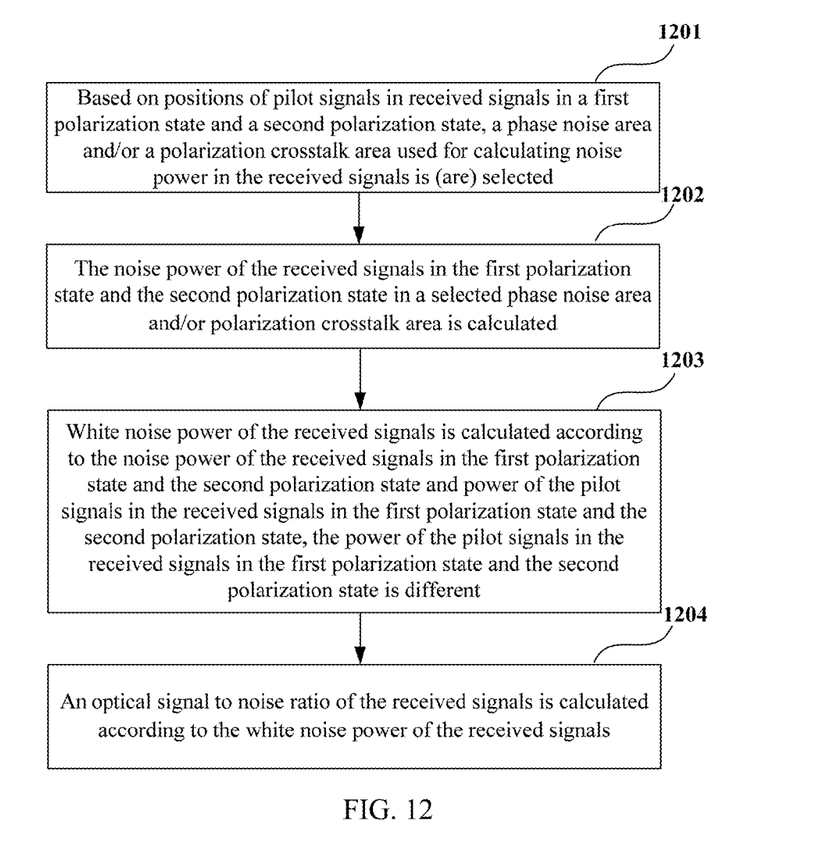
FIG. 12 is a flowchart of the monitoring method for an optical signal to noise ratio according to an embodiment of the present disclosure.

An embodiment of the present disclosure further provides a monitoring method for an optical signal to noise ratio, corresponding to the monitoring apparatus for an optical signal to noise ratio of Embodiment 1. FIG. 12 is a flowchart of the monitoring method for an optical signal to noise ratio of this embodiment.

As shown in FIG. 12, the method includes Step (operation) 1201: based on positions of pilot signals in received signals in a first polarization state and a second polarization state, a phase noise area and/or a polarization crosstalk area used for calculating noise power in the received signals is (are) selected, and Step (operation) 1202: the noise power of the received signals in the first polarization state and the second polarization state in a selected phase noise area and/or polarization crosstalk area is calculated.

The method shown in FIG. 12 includes Step (operation) 1203: white noise power of the received signals is calculated according to the noise power of the received signals in the first polarization state and the second polarization state and power of the pilot signals in the received signals in the first polarization state and the second polarization state, the power of the pilot signals in the received signals in the first polarization state and the second polarization state is different, and Step (operation) 1204: an optical signal to noise ratio of the received signals is calculated according to the white noise power of the received signals.

In this embodiment, a method for selecting a phase noise area and/or a polarization crosstalk area, a method for calculating noise power, a method for calculating white noise power and a method for calculating an optical signal to noise ratio are identical to those described in Embodiment 1, which shall not be described herein any further.

It can be seen from the above embodiment that the white noise power of received signals is calculated according to the noise power and power of pilot signals of the received signals in different polarization states, and influence of a nonlinear noise is excluded, thereby accurately estimating the optical signal to noise ratio, with the calculation process being simple and the application range being relatively wide.

Embodiment 7

Figure 13:
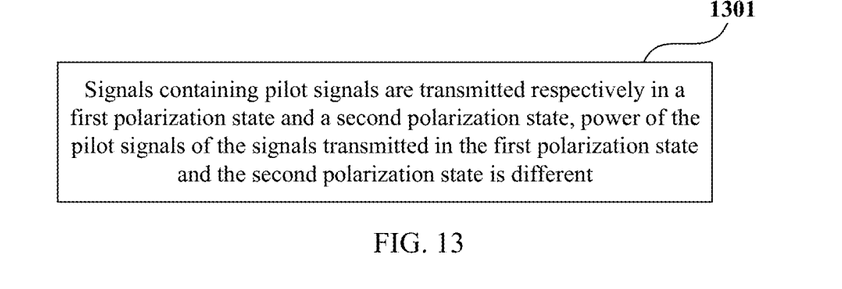
FIG. 13 is a flowchart of the signal transmission method according to an embodiment of the present disclosure.

An embodiment of the present disclosure further provides a signal transmission method, corresponding to the signal transmission apparatus of Embodiment 2. FIG. 13 is a flowchart of the signal transmission method of this embodiment. As shown in FIG. 13, the method includes:

Step 1301: signals containing pilot signals are transmitted respectively in a first polarization state and a second polarization state, power of the pilot signals of the signals transmitted in the first polarization state and the second polarization state is different.

In this embodiment, a method for transmitting signals respectively in two polarization states is identical to that described in embodiments 1 and 2, which shall not be described herein any further.

It can be seen from the above embodiment that as the power of the pilot signals of the signals transmitted in the first polarization state and the second polarization state are different, the white noise power of received signals is calculated according to the noise power and power of pilot signals of the received signals in different polarization states, and influence of a nonlinear noise is excluded, thereby accurately estimating the optical signal to noise ratio, with the calculation process being simple and the application range being relatively wide.

An embodiment of the present disclosure further provides a computer-readable program, when the program is executed in a monitoring apparatus for an optical signal to noise ratio or a receiver, the program enables a computer to carry out the monitoring method for an optical signal to noise ratio as described in Embodiment 6 in the monitoring apparatus for an optical signal to noise ratio or the receiver.

An embodiment of the present disclosure further provides a computer-readable program, when the program is executed in a signal transmission apparatus or a transmitter, the program enables a computer to carry out the signal transmission method as described in Embodiment 7 in the signal transmission apparatus or the transmitter.

An embodiment of the present disclosure further provides a storage medium in which a computer readable program is stored, the computer readable program enables a computer to carry out the monitoring method for an optical signal to noise ratio as described in Embodiment 6 in a monitoring apparatus for an optical signal to noise ratio or a receiver.

An embodiment of the present disclosure further provides a storage medium which stores a computer readable program, the computer readable program enables a computer to carry out the signal transmission method as described in Embodiment 7 in a signal transmission apparatus or a transmitter.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

For the implementation containing the above embodiments, following supplements are further disclosed.

Supplement 1. A monitoring apparatus for an optical signal to noise ratio, including a selecting unit configured to, based on positions of pilot signals in received signals in a first polarization state and a second polarization state, select a phase noise area and/or a polarization crosstalk area used for calculating noise power in the received signals. The monitoring apparatus includes a first calculating unit configured to calculate the noise power of the received signals in the first polarization state and the second polarization state in a selected phase noise area and/or polarization crosstalk area.

As described herein, the monitoring apparatus includes a second calculating unit configured to calculate white noise power of the received signals according to the noise power of the received signals in the first polarization state and the second polarization state and power of the pilot signals in the received signals in the first polarization state and the second polarization state; wherein, the power of the pilot signals in the received signals in the first polarization state and the second polarization state is different, and a third calculating unit configured to calculate an optical signal to noise ratio of the received signals according to the white noise power of the received signals.

Supplement 2. The apparatus according to supplement 1, wherein, the second calculating unit is configured to calculate the white noise power of the received signals according to a relation between a ratio of the noise power of the received signals in the first polarization state and the second polarization state and a ratio of the power of the pilot signals in the received signals in the first polarization state and the second polarization state.

Supplement 3. The apparatus according to supplement 1, wherein, the selecting unit is configured to select the phase noise area and/or the polarization crosstalk area used for calculating noise power based on the positions of the pilot signals in the received signals and according to dispersion generated in a transmission link.

Supplement 4. The apparatus according to supplement 3, wherein the selecting unit includes a first selecting unit configured to select the phase noise area based on the positions of the pilot signals in the received signals when the dispersion generated in the transmission link is greater than a predetermined threshold value.

The apparatus according to supplement 3, wherein the selecting unit includes a second selecting unit configured to select the phase noise area and/or the polarization crosstalk area based on the positions of the pilot signals in the received signals when the dispersion generated in the transmission link is less than or equal to the predetermined threshold value.

Supplement 5. A signal transmission apparatus, includes a transmitting unit configured to transmit signals containing pilot signals respectively in a first polarization state and a second polarization state; wherein power of the pilot signals of the signals transmitted in the first polarization state and the second polarization state is different.

Supplement 6. The apparatus according to supplement 5, wherein, the transmitting unit determines the power of the pilot signals of the signals transmitted in the first polarization state and the second polarization state according to constellation points having different modulo values in a constellation map of quadrature amplitude modulation.

Supplement 7. A receiver, including the monitoring apparatus for an optical signal to noise ratio as described in any one of supplements 1-4.

Supplement 8. A transmitter, including the signal transmission apparatus according to supplement 5 or 6.

Supplement 9. A communications system, including the receiver according to supplement 7 and the transmitter according to supplement 8.

Supplement 10. A monitoring method for an optical signal to noise ratio includes based on positions of pilot signals in received signals in a first polarization state and a second polarization state, selecting a phase noise area and/or a polarization crosstalk area used for calculating noise power in the received signals, and calculating the noise power of the received signals in the first polarization state and the second polarization state in a selected phase noise area and/or polarization crosstalk area.

The monitoring method for an optical signal to noise ratio includes calculating white noise power of the received signals according to the noise power of the received signals in the first polarization state and the second polarization state and power of the pilot signals in the received signals in the first polarization state and the second polarization state; wherein, the power of the pilot signals in the received signals in the first polarization state and the second polarization state is different, and calculating an optical signal to noise ratio of the received signals according to the white noise power of the received signals.

Supplement 11. The method according to supplement 10, wherein, the calculating white noise power of the received signals according to the noise power of the received signals in the first polarization state and the second polarization state and power of the pilot signals in the received signals in the first polarization state and the second polarization state includes: calculating the white noise power of the received signals according to a relation between a ratio of the noise power of the received signals in the first polarization state and the second polarization state and a ratio of the power of the pilot signals in the received signals in the first polarization state and the second polarization state.

Supplement 12. The method according to supplement 10, wherein, the based on positions of pilot signals in received signals in a first polarization state and a second polarization state, selecting a phase noise area and/or a polarization crosstalk area used for calculating noise power in the received signals, includes: selecting the phase noise area and/or the polarization crosstalk area used for calculating noise power based on the positions of the pilot signals in the received signals and according to dispersion generated in a transmission link.

Supplement 13. The method according to supplement 12, wherein the selecting the phase noise area and/or the polarization crosstalk area used for calculating noise power based on the positions of the pilot signals in the received signals according to dispersion generated in a transmission link includes: selecting the phase noise area based on the positions of the pilot signals in the received signals when the dispersion generated in the transmission link is greater than a predetermined threshold value; and selecting the phase noise area and/or the polarization crosstalk area based on the positions of the pilot signals in the received signals when the dispersion generated in the transmission link is less than or equal to the predetermined threshold value.

Supplement 14. A signal transmission method, including: transmitting signals containing pilot signals respectively in a first polarization state and a second polarization state; wherein power of the pilot signals of the signals transmitted in the first polarization state and the second polarization state is different.

Supplement 15. The method according to supplement 14, wherein, the transmitting signals containing pilot signals respectively in a first polarization state and a second polarization state includes: determining the power of the pilot signals of the signals transmitted in the first polarization state and the second polarization state according to constellation points having different modulo values in a constellation map of quadrature amplitude modulation.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A monitoring apparatus for a receiver in a communication system, to calculate an optical signal to noise ratio (OSNR) for the receiver including an optical front end to convert input optical signals into output signals in first and second polarization states for the monitoring apparatus, the monitoring apparatus comprising:
a memory that stores a plurality of instructions; and
a processor coupled to the memory and configured to execute the instructions to:
based on determined positions of pilot signals in the signals received from the receiver in the first polarization state and the second polarization state, select a phase noise area and/or a polarization crosstalk area used for calculating noise power in the received signals;
calculate the noise power of the received signals in the first polarization state and the second polarization state in the selected phase noise area and/or polarization crosstalk area;
calculate white noise power of the received signals according to, the noise power of the received signals in the first polarization state and the second polarization state, and
power of the pilot signals in the received signals in the first polarization state and the second polarization state,
the power of the pilot signals in the received signals in the first polarization state and the second polarization state being different; and
calculate the OSNR of the received signals according to the white noise power of the received signals,
wherein a communication system performance analysis by the communication system is performed in accordance with the OSNR monitored for the receiver.

2. The apparatus according to claim 1, wherein,
the processor is configured to execute the instructions to calculate the white noise power of the received signals according to a relation between a ratio of the noise power of the received signals in the first polarization state and the second polarization state and a ratio of the power of the pilot signals in the received signals in the first polarization state and the second polarization state.

3. The apparatus according to claim 1, wherein,
the processor is configured to execute the instructions to select the phase noise area and/or the polarization crosstalk area used for calculating the noise power based on the positions of the pilot signals in the received signals and according to dispersion generated in a transmission link.

4. The apparatus according to claim 3, wherein the processor is configured to execute the instructions to:
select the phase noise area based on the positions of the pilot signals in the received signals when the dispersion generated in the transmission link is greater than a predetermined threshold value; and
select the phase noise area and/or the polarization crosstalk area based on the positions of the pilot signals in the received signals when the dispersion generated in the transmission link is less than or equal to the predetermined threshold value.

5. A receiver, comprising the monitoring apparatus for an optical signal to noise ratio as claimed in claim 1.

* * * * *